US008483629B2

(12) United States Patent  (10) Patent No.: US 8,483,629 B2
Hottinen et al.  (45) Date of Patent: Jul. 9, 2013

(54) DETERMINATION OF COUPLING BETWEEN RADIO DEVICES

(75) Inventors: Ari Hottinen, Espoo (FI); Mikko A. Uusitalo, Helsinki (FI)

(73) Assignee: Nokia Corporation, Espoo (FI)

(*) Notice: Subject to any disclaimer, the term of this patent is extended or adjusted under 35 U.S.C. 154(b) by 923 days.

(21) Appl. No.: 12/459,101

(22) Filed: Jun. 26, 2009

(65) Prior Publication Data
US 2010/0331026 A1 Dec. 30, 2010

(51) Int. Cl.
*H04B 5/00* (2006.01)
*H04B 7/00* (2006.01)
*H04B 7/02* (2006.01)

(52) U.S. Cl.
USPC ....... 455/101; 455/41.1; 455/426.1; 455/41.2

(58) Field of Classification Search
USPC .............................. 455/501, 522, 67.13, 226.1
See application file for complete search history.

(56) References Cited

U.S. PATENT DOCUMENTS

| 7,024,162 | B2* | 4/2006 | Muthuswamy et al. ... | 455/67.11 |
| 7,801,490 | B1* | 9/2010 | Scherzer .................... | 455/67.13 |
| 7,813,318 | B2* | 10/2010 | Hu ................................. | 370/329 |
| 7,877,109 | B2* | 1/2011 | Hyon et al. .................. | 455/522 |
| 7,986,976 | B2* | 7/2011 | Osann, Jr. .................... | 455/567 |
| 8,004,995 | B2* | 8/2011 | Hyon et al. .................. | 370/241 |
| 8,068,826 | B2* | 11/2011 | Kuffner et al. ............... | 455/423 |
| 8,107,391 | B2* | 1/2012 | Wu et al. ...................... | 370/252 |
| 8,140,085 | B2* | 3/2012 | Chaudhri et al. ............. | 455/450 |
| 8,274,885 | B2* | 9/2012 | Wu et al. ...................... | 370/230 |
| 8,326,336 | B2* | 12/2012 | Um et al. ...................... | 455/513 |
| 8,335,204 | B2* | 12/2012 | Samarasooriya et al. .... | 370/347 |
| 2007/0202867 | A1* | 8/2007 | Waltho et al. ................. | 455/423 |
| 2007/0213046 | A1* | 9/2007 | Li et al. ......................... | 455/425 |
| 2009/0011788 | A1 | 1/2009 | Shan et al. .................... | 455/522 |

FOREIGN PATENT DOCUMENTS
EP 1 667 372 A1 11/2005

OTHER PUBLICATIONS

"Cognitive Radio: Brain-Empowered Wireless Communications", Simon Haykin, IEEE Journal on Selected Areas in Communications, Vo. 25, No. 2, Feb. 2005, pp. 201-220.
"What is a Spectrum Hole and What does it Take to Recognize One?", Proceedings of the IEEE, vol. 97, No. 5, May 2009 (pp. 824-848).
"A survey of Spectrum Sensing Algorithms for Cognitive Radio Applications", IEEE Communications Surveys and Tutorials, vol. 11, No. 1, (2000), (pp. 116-130).

* cited by examiner

*Primary Examiner* — Tilahun B Gesesse
(74) *Attorney, Agent, or Firm* — Harrington & Smith

(57) ABSTRACT

A method includes transmitting, from a radio device of a secondary communication system, a signal into a channel of a primary communication system; monitoring channel signal quality-related feedback of the primary system; determining, based on the monitored channel signal quality-related feedback, an amount of mutual coupling between the transmitted signal and the channel, if any, caused by the transmitted signal; and if the amount of determined mutual coupling is less than a threshold amount, using the channel for communication with another radio device of the secondary communication system. The signal that is transmitted may be a probing signal having at least a predetermined temporally varying transmission pattern, and where determining includes correlating at least the predetermined temporally varying transmission pattern with changes, if any, in the monitored channel signal quality-related feedback. The channel signal quality-related feedback that is monitored may include at least one of ACK/NACK feedback, power control feedback, rate control feedback and channel quality indicator feedback.

18 Claims, 3 Drawing Sheets

DETERMINATION OF COUPLING BETWEEN RADIO DEVICES

TECHNICAL FIELD

The exemplary and non-limiting embodiments of this invention relate generally to wireless communication systems, methods, devices and computer programs and, more specifically, relate to interference avoidance and to a determination of suitable channels and subchannels for conducting communications.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
ACK/NACK acknowledge/not (negative) acknowledge
CDMA code division multiple access
CQI channel quality indicator
SDR software defined radio
SIR signal-to-inference ratio
QoS quality of service In IEEE Journal on Selected Areas in Communications, VOL. 23, NO. 2, pp. 201-220 February 2005, Cognitive Radio: Brain-Empowered Wireless Communications, Simon Haykin offered the following definition of cognitive radio:

"Cognitive radio is an intelligent wireless communication system that is aware of its surrounding environment (i.e., outside world), and uses the methodology of understanding-by-building to learn from the environment and adapt its internal states to statistical variations in the incoming RF stimuli by making corresponding changes in certain operating parameters (e.g., transmit-power, carrier-frequency, and modulation strategy) in real-time, with two primary objectives in mind: highly reliable communications whenever and wherever needed; efficient utilization of the radio spectrum."

Without effective avoidance of primary users, cognitive radio networks are unlikely to succeed. In a cognitive radio network there are primary users that communicate on a given frequency channel (for example), and it is desirable that the communication between the primary users not be disturbed to any significant extent. However, for efficient spectrum use the communication channels should be reused whenever possible by a pool of secondary users. When the secondary users communicate they should attempt to avoid the primary users as much as possible.

SUMMARY

In a first aspect thereof the exemplary embodiments of this invention provide a method that comprises transmitting, from a radio device of a secondary communication system, a signal into a channel of a primary communication system; monitoring channel signal quality-related feedback of the primary system; determining, based on the monitored channel signal quality-related feedback, an amount of mutual coupling between the transmitted signal and the channel, if any, caused by the transmitted signal; and if the amount of determined mutual coupling is less than a threshold amount, using the channel for communication with another radio device of the secondary communication system.

The exemplary embodiments of this invention also encompass in another aspect thereof an apparatus that comprises at least one processor and at least one memory including computer program code. The at least one memory and the computer program code are configured to, with the at least one processor, cause the apparatus to transmit a signal from a radio device of a secondary communication system into a channel of a primary communication system; to receive and monitor channel signal quality-related feedback of the primary system; to determine, based on the monitored channel signal quality-related feedback, an amount of mutual coupling between the transmitted signal and the channel, if any, caused by the transmitted signal; and if the amount of determined mutual coupling is less than a threshold amount, to use the channel for communication with another radio device of the secondary communication system.

DETAILED DESCRIPTION

The foregoing definition of cognitive radio, while appearing to be a reasonable definition, is not intended to be limiting in any respect with regard to the exemplary embodiments of this invention.

The exemplary embodiments of this invention relate generally to radio networks, such as cognitive radio networks, where avoidance of mutual coupling between a signal transmitted by a secondary communication system and a channel or channels of a primary system, and a search for vacant channels or subchannels, is needed for successful network operation. Without intending to unduly limit the exemplary embodiments of this invention, the mutual coupling that may exist between the signal transmitted by the secondary communication system and the channel or channels of the primary system may be manifested as radio interference, or more simply as interference. Herein the phrase "mutual coupling" and the phrase "radio interference", or more simply "interference", may be used interchangeably. In general, a radio unit or device of the secondary communication system may determine any function that depends on both at least one feedback signal of the primary communication system and a transmitted signal of the secondary radio unit or device of the secondary communication system, and to use the determined function to control the selection and use of at least one radio resource by a transceiver of the radio unit or device of the secondary communication system.

The exemplary embodiments of this invention relate at least in part to a determination of the interference induced by a secondary communication system into a primary communication system. The induced interference is estimated or measured at a radio device of the secondary system, and is used to control a transmission policy of the secondary system. The exemplary embodiments of this invention use explicit feedback signaling that occurs in the primary system (the system to be avoided).

It is noted that it may be possible to use pathloss measurements, e.g., pilot channel measurements, to obtain a rough estimate of the interference between networks. However, the transmit power of the related pilot signal would need to be known in order to compute the pathloss, which is often not possible to ascertain in a typical use scenario.

On the transmit side, conventionally, cognitive radio networks are based on channel sensing, where the secondary system transmitter senses the wireless medium, or its channels/subchannels, and attempts to locate 'white spaces', i.e., underutilized spectrum or channel 'holes'. The wireless medium sensing relates to channel usage at the location of the secondary wireless unit or radio device, or possibly at a destination node of the secondary transmitter (via feedback from the destination node).

Figure 1:
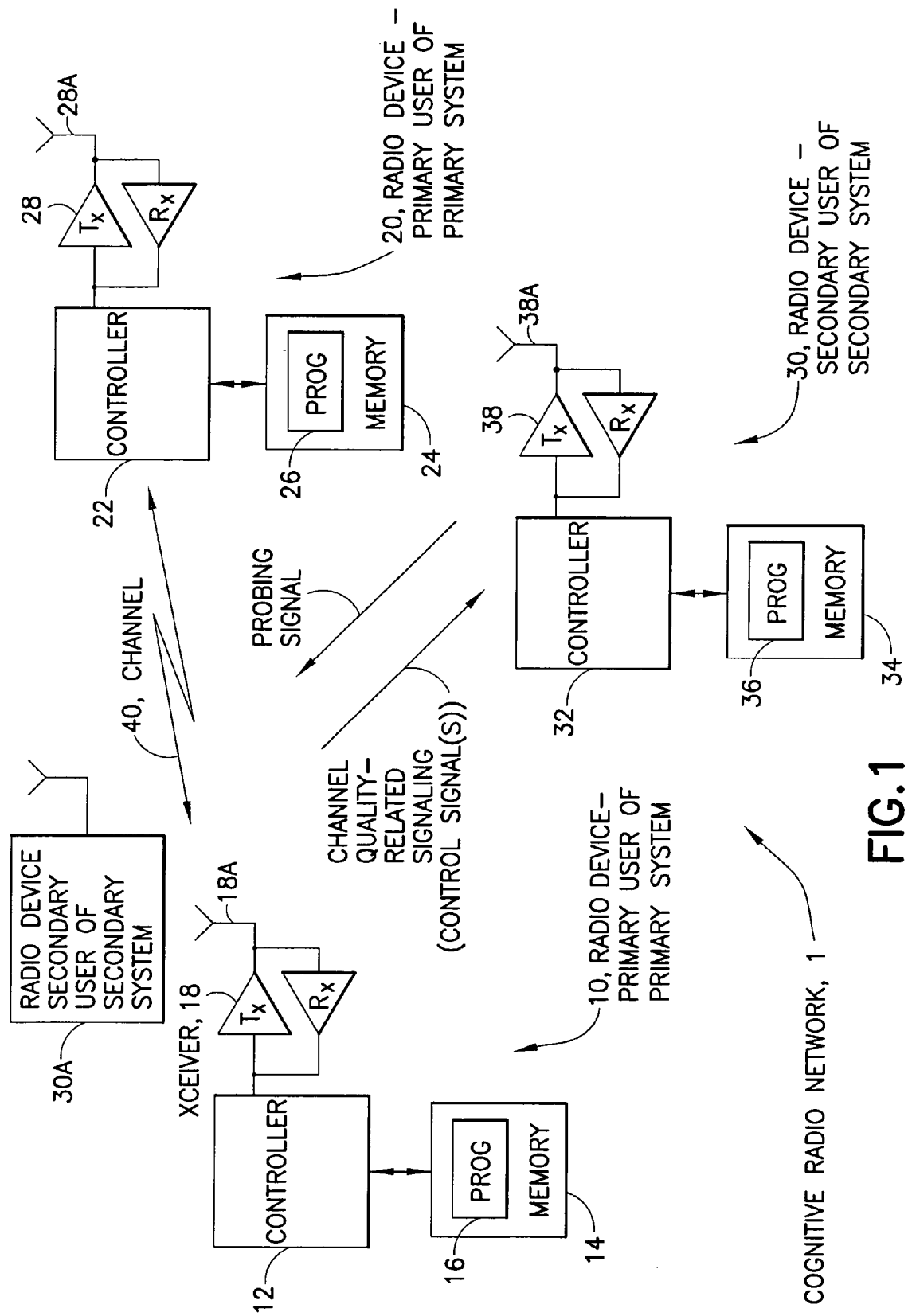
FIG. 1 is a simplified block diagram of a portion of a cognitive radio network containing radio devices associated with at least two primary users and secondary users (one of which is shown).

FIG. 1 is a simplified block diagram of a portion of a cognitive radio network 1 containing radio devices 10, 20, 30 and 30A associated with at least two primary users (radio devices 10, 20) and secondary users (30, 30A). For the purposes of describing the exemplary embodiments of this invention it may be assumed that the various radio devices 10, 20, 30, 30A are similarly constructed (only the radio device 30 is shown in detail), and each includes at least one data processor or controller 12, 22, 32, at least one memory 14, 24, 34 storing any necessary data and a program (PROG) 16, 26, 36 of instructions configured to direct and operate the associated controller, and at least one wireless (radio) transceiver 18, 28, 38 each containing at least one transmitter (Tx) and at least one receiver (Rx) coupled with at least one antenna 18A, 28A, 38A. At any given time the primary user radio devices 10, 20 associated with the primary users may be in communication via a channel 40. For example, the radio device 10 may comprise a cellular phone, and the radio device 20 may comprise a wireless network access node, such as an access point (AP) or a base station (BS). The radio devices 10, 20, 30 and 30A may also be referred to simply as radio units, and the radio devices or units 10 and 20 may be assumed to be associated with a primary radio system, or more simply with a primary system, and the radio devices or units 30, 30A may be assumed to be associated with a secondary radio system (secondary system).

The controllers 12, 22, 32 may each be embodied as one or more data processors, such as digital signal processors, general purpose single core processors, multi-core processors and combinations thereof, as non-limiting examples. The memories 14, 24, 34 may be embodied as one or more memory devices or units, and may be of any type suitable for the local technical environment.

In accordance with the exemplary embodiments of this invention the secondary wireless unit 30 listens to (receives and monitors) the control signals of the primary system and derives a measure of interference that the secondary unit 30 causes to the primary system. If the control signal of the primary system correlates significantly with the transmission pattern of the secondary system, then it is assumed that the secondary system would cause interference to the primary system. In this case the secondary unit 30 ceases transmission on the applicable channel. If there is no significant correlation found, the same channel can be used by both the primary system and the secondary system without introducing harmful interference. In this case, and for example, the channel 40 may then also be used by the secondary radio unit 30 to communicate with the secondary radio unit 30A.

Note that a particular channel that is found may, at the current time, not be used by any radio units of the primary system, and may thus be temporarily vacant and usable by the radio units 30, 30A of the secondary system.

As was noted above, the use of a pathloss measurement is not generally feasible if the transmission power of a pilot signal is not known. Moreover, the pathloss (or similar) measurements do not reflect the capabilities of either the primary system or the secondary system to mitigate interference by, for example, beamforming (transmit or receive) or interference cancellation. Thus, there is a need to for the secondary system to use a signal that does reflect these issues when determining spectrum or channel use.

In the exemplary embodiments of this invention the secondary wireless unit 30 estimates the effect (e.g., interference, congestion, or similar) that is (or would be) caused to the primary system in the event it would transmit on the same channel as a primary unit 10, 20. In an exemplary method of the invention, the secondary wireless unit 30 listens to (receives) the control signals of the primary system, and uses the primary system control signaling to determine its own transmission opportunities and interference measures.

In an exemplary aspect of this invention the secondary unit 30 transmits a probing signal, with a transmission pattern known to the secondary unit 30. For example, the secondary unit 30 transmits using on-off keying on a channel (e.g., on a sub-carrier) of the primary system using a pseudo-random or similar sequence of silent (off) and active (on) transmission periods. The transmission power of the probing signal may vary over time, for example, by beginning with a low transmission power and then gradually increasing the transmission power.

In an exemplary embodiment the primary system operates as usual on a given channel, and may be totally unaware of the secondary wireless unit 30. However, the radio units 10, 20 of the primary system are assumed to include channel quality estimation capabilities, which may be embodied as part of the program 16, 26 in combination with the Rx function of the transceiver 18, 28. The channel quality estimation function may be based on, for example, the determination of a signal-to-interference ratio. The radio units 10, 20 of the primary system are also assumed to include related control signaling resources, which may be embodied as part of the program 16, 26 in combination with the Tx function of the transceiver 18, 28.

In the exemplary embodiments of this invention the secondary wireless unit 30 receives and monitors control signals of the primary system. The control signals may be generally considered as being channel quality-related signaling of the primary system, and may include at least one of the following: ACK/NACK feedback, power control feedback, rate control feedback or CQI feedback. The secondary wireless unit 30 then uses the knowledge of its own probing signal transmission pattern, and at least one of the control signals of the primary system, to derive a measure of the interference that the secondary unit causes to the primary system (at some given transmit power). For example, the secondary wireless unit 30 may listen to the power control bits of the primary system. If the power control bits dictate a power increase for the primary system whenever (or using some threshold frequency) the secondary wireless unit 30 probes the channel, the secondary wireless unit 30 may assume that the indicated increase in commanded power is due to interference induced by the probing signal, and thus terminates using (probing) the corresponding channel. If no change is observed in the power control bits that may be attributable to the probing signal, the secondary wireless unit 30 may continue sending data, or transmitting the probing signal with the same or higher power (while continuing to compute the given 'interference' measure).

As was noted above, the exemplary embodiments of this invention may be implemented in such a manner that the primary system is not aware of the presence or the behavior of the secondary system. In this case, the transmission powers or patterns are selected by the secondary wireless unit 30 to ensure that the capacity loss or QoS loss to the primary system is effectively negligible.

However, the interference measurements can also be conducted in a case where the primary system is aware of the presence of the secondary system, and where they can negotiate with one another. In this case the primary may even signal the transmission opportunities in real-time to the secondary system.

Figure 2:
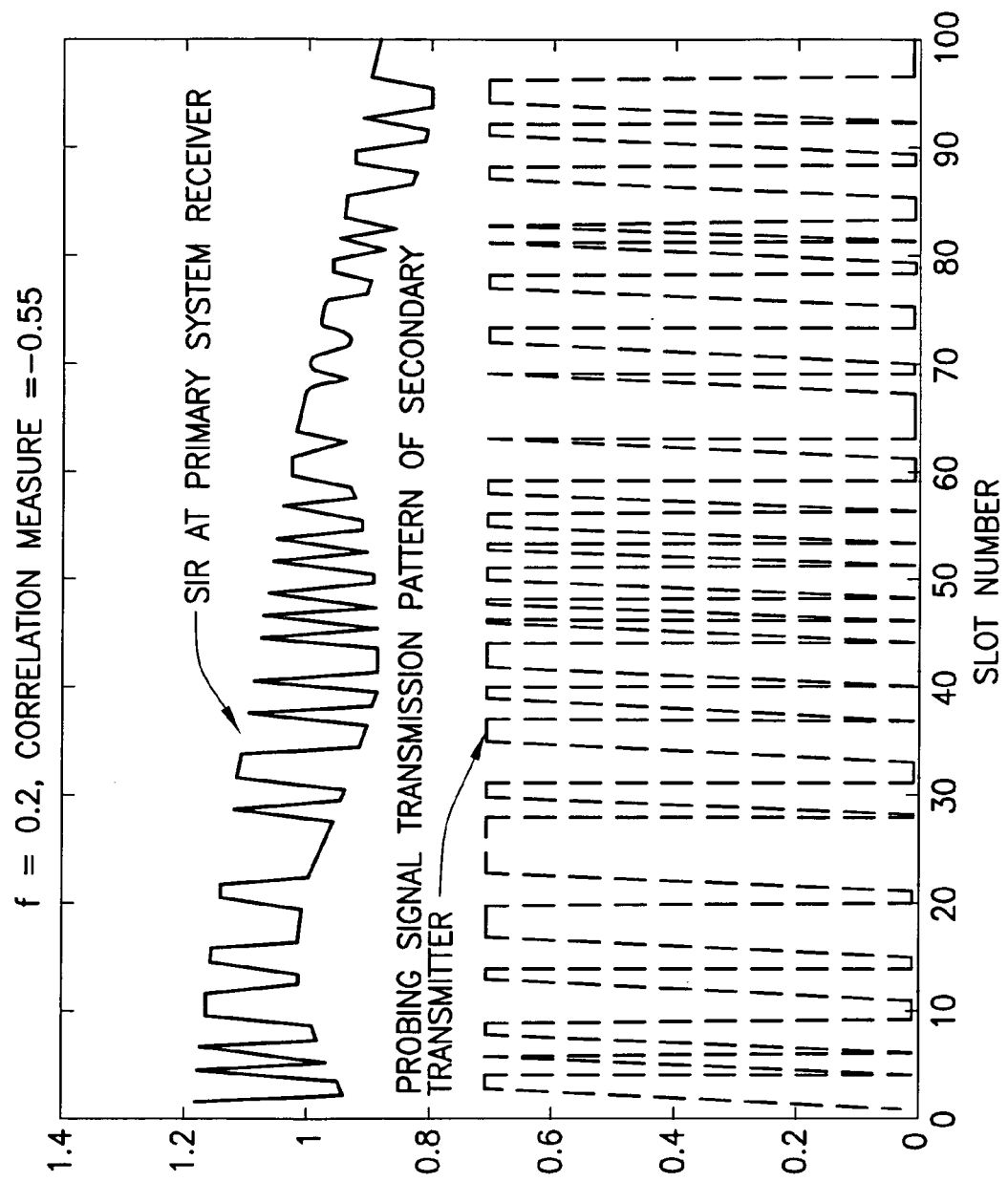
FIG. 2 is a graph showing a simulated probing signal and consequent SIR of a primary system receiver over 100 test slots.

FIG. 2 shows the result of an exemplary simulation on the effect of 100 test slots of a varied probing signal on the SIR of the Rx of the primary wireless unit (e.g., wireless unit 10). The correlation between the signaling waveforms (e.g., CDMA codes) of the primary system and the secondary system transmission waveform is 0.2 (randomly selected for illustration purposes only). In addition, it may be assumed that there is spatial separation between the two systems so that interference power due to pathloss is 3 dB weaker than the useful signal in the two systems, respectively. The normalized correlation measure (related to the correlation between transmission pattern of the secondary system and the quantized SIR of the primary system) is in the exemplary case greater than −0.55. This measure may be computed using various different techniques, and is not restricted to any particular computational approach.

A numerical value for the level of interference may be, as non-limiting examples, an average of the changes in the SIR at the time of changes in the probing signal, or a correlation between the probing signal and the SIR, or some function that depends on the SIR, signal power, interference power, or similar parameters.

If the level of interference found would be higher than a defined level, the secondary wireless unit 30 changes the channel and begins a new probing test until a suitable channel is found. It is also within the scope of these exemplary embodiments to test several, possibly all, potential channels first, and then select for use the channel that is estimated by the secondary wireless unit 30 to cause the least interference to the primary system.

If desired the secondary wireless unit 30 may reduce the number of test slots to one. In this case the risk of inducing harmful interference into the primary system would be low (or at least temporally compressed so as to affect a small number of symbols of the primary system). If the one slot test signal results in a too large a decrease in the SIR or other signaled parameter, the secondary wireless unit 30 may change the channel, or use the same test slot with a reduced probing signal transmit power.

It is also within the scope of the exemplary embodiments of this invention for the secondary wireless unit 30 to simply begin communication with an increasing amplitude, and to then change its behavior if an induced harmful interference is detected from the primary system signaling, e.g., from too large a decrease in SIR and/or from NACK feedback (indicating that a given transmission in the primary system was not received, with a possible implied or implicit request for a re-transmission).

The use of these exemplary embodiments of the invention enables interference measurements and subsequent network interference links using existing signaling channels of the primary system. The radio unit 30 of the secondary system is thus enabled to transmit when it is verified that interference is avoided or at least minimized at the receiver (Rx) of a primary system radio unit 10, 20. The transmission power used by the secondary wireless unit 30 may be tuned to enable the primary and secondary systems to coexist (possibly at the expense of the QoS of the secondary system).

Further, as the secondary system wireless unit 30 may use the existing signaling channels of the primary system, there is no requirement to modify the behavior of the primary system radio units 10, 20 who may be, as was noted above, not aware of the presence of the secondary system wireless unit 30.

In general, the use of these exemplary embodiments provides as one technical effect an increased efficiency of spectrum usage and spectrum sharing between a primary radio system and one or more secondary radio systems.

In the case of the entry of one new secondary system wireless unit 30 at a time, the exemplary embodiments of this invention are particularly useful. With the possibility of two or more new secondary wireless units 30 entering the secondary system simultaneously, additional considerations may be useful. For example, and related to the discussion above, a particular one of the secondary wireless units 30 may preferably begin using a suitable channel as soon as one is located, as opposed to locating a plurality of possible candidate suitable channels and then selecting one of them. Further by example, in the presence of multiple secondary users, each of them (or at least two of them) can use a distinct pseudo-random probing sequence, e.g., with a different on-off keying pattern. Each of the secondary users can then determine the effect they cause to the primary system, using their own probing sequence, as the effect of other secondary users are averaged out. The user-specific sequences can be pseudo-random or, e.g., in a synchronous system, time-aligned so that different secondary users transmit and receive feedback channels at distinct time-intervals. The use of pseudo-random patterns may be preferred if the network is fully decentralized, i.e., when the transmission instants of different secondary users cannot be coordinated.

In general, it is assumed that the radio unit 30 of the secondary communication system has knowledge of at least one feedback channel structure and operation of same for at least one type of primary system to enable it to receive, demodulate and monitor the channel quality related feedback information that passes in one or both directions between the radio units 10, 20. Further in this regard the secondary radio unit 30 may be implemented with software radio technologies (e.g., software defined radio or SDR) allowing it to be readily programmed to receive the control channels depending on the primary system active in a given area, time, or frequency. Alternatively, or in conjunction with the use of SDR, the secondary wireless unit 30 may include multiple hardware resources, and software, for being able to detect the messages transmitted by the primary system. For example, the secondary radio unit 30 may include multiple instances of the transceiver 38, each configured for use with a different radio standard, and possibly multiple instances of software programs corresponding to the multiple instances of the transceivers 38. These software programs may be stored in the memory 34 in order to implement applicable radio standard protocols and operating procedures.

Based on the foregoing it should be apparent that the exemplary embodiments of this invention provide a method, apparatus and computer program(s) to determine interference induced by a secondary communication system into a primary communication system, where the induced interference is estimated or measured at a radio device of the secondary system and is used to control a transmission policy of the secondary system.

Figure 3:
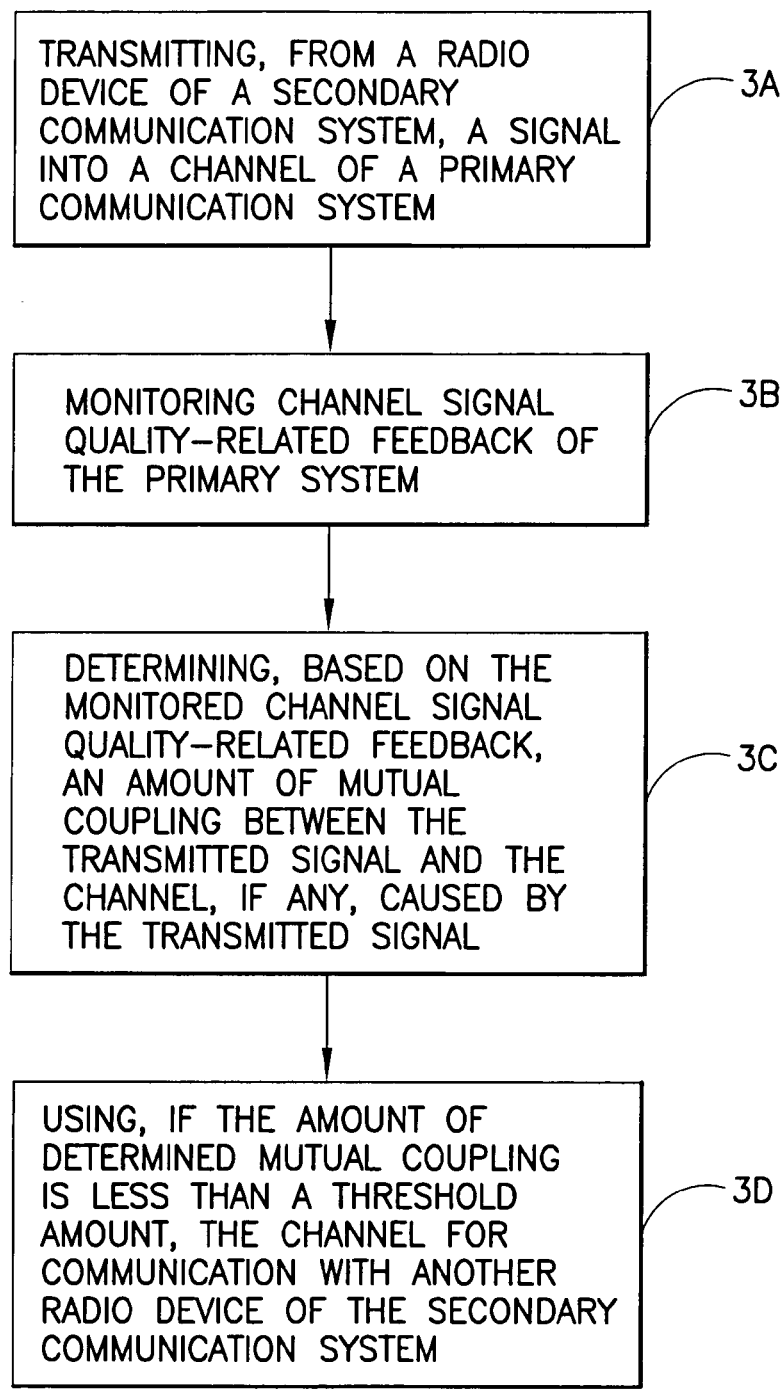
FIG. 3 is a logic flow diagram that illustrates the operation of a method, and a result of execution of computer program instructions embodied on a computer readable memory, in accordance with the exemplary embodiments of this invention.

FIG. 3 is a logic flow diagram that illustrates the operation of a method, and a result of execution of computer program instructions, in accordance with the exemplary embodiments of this invention. In accordance with these exemplary embodiments a method performs, at Block 3A, an operation of transmitting, from a radio device of a secondary communication system, a signal into a channel of a primary communication system. At Block 3B there is an operation of monitoring channel signal quality-related feedback of the primary system. At Block 3C there is an operation of determining, based on the monitored channel signal quality-related feedback, an amount of mutual coupling between the transmitted signal and the channel, if any, caused by the transmitted signal. At Block 3D there is an operation of using, if the amount of determined mutual coupling is less than a threshold amount, the channel for communication with another radio device of the secondary communication system.

In accordance with the method, and the operation of the computer program instructions, as in FIG. 3, where the signal that is transmitted is a probing signal having at least a predetermined temporally varying transmission pattern, and where determining comprises correlating at least the predetermined temporally varying transmission pattern with changes, if any, in the monitored channel signal quality-related feedback.

In accordance with the method, and the operation of the computer program instructions, of the preceding paragraph where the temporally varying probing signal varies in an on/off manner in accordance with occurrences of time slots of the channel.

In accordance with the method, and the operation of the computer program instructions, as in either of the preceding two paragraphs, where the probing signal further has a predetermined temporally varying transmission power, and where determining comprises correlating at least the predetermined temporally varying transmission pattern and transmission power with changes, if any, in the monitored channel signal quality-related feedback.

In accordance with the method, and the operation of the computer program instructions, as in FIG. 3, where the signal that is transmitted is a communication signal transmitted to another radio device of the secondary communication system.

In accordance with the method, and the operation of the computer program instructions, as in FIG. 3, where the channel signal quality-related feedback that is monitored is comprised of at least one of ACK/NACK feedback, power control feedback, rate control feedback and channel quality indicator feedback.

In accordance with the method, and the operation of the computer program instructions, as in FIG. 3, where the operation of determining comprises estimating a level of interference at a receiver of the primary system due to the transmitted signal, where the estimated level of interference comprises at least one of an average of changes in an estimated signal to interference ratio at the receiver at times that the transmitted signal changes, and a correlation between the transmitted signal changes and the signal to interference ratio at the receiver.

In accordance with the method, and the operation of the computer program instructions, as in FIG. 3, where if the amount of determined mutual coupling is greater than the threshold amount, the radio device of the secondary communication system transmits a signal into a different channel of the primary communication system, and repeats the operations of monitoring and determining in the different channel.

In accordance with the method, and the operation of the computer program instructions, as in FIG. 3, where if the amount of determined mutual coupling is greater than the threshold amount, the radio device of the secondary communication system transmits the signal, with a reduced power level, into the same channel of the primary communication system, and repeats the operations of monitoring and determining in the same channel.

In accordance with the method, and the operation of the computer program instructions, as in preceding paragraph, where the operations of transmitting, monitoring and determining are repeated until the amount of determined mutual coupling is less than the threshold amount, and where using the channel for communication with another radio device of the secondary communication system uses the same channel with a power level that does not exceed a power level at which the signal was transmitted when the mutual coupling was determined to be less than the threshold amount.

The various blocks shown in FIG. 3 may be viewed as method steps, and/or as operations that result from operation of computer program code, and/or as a plurality of coupled logic circuit elements constructed to carry out the associated function(s).

The exemplary embodiments of this invention also encompass an apparatus that comprises at least one processor and at least one memory including computer program code. The at least one memory and the computer program code are configured to, with the at least one processor, cause the apparatus to transmit a signal from a radio device of a secondary communication system into a channel of a primary communication system; to receive and monitor channel signal quality-related feedback of the primary system; to determine, based on the monitored channel signal quality-related feedback, an amount of mutual coupling between the transmitted signal and the channel, if any, caused by the transmitted signal; and if the amount of determined mutual coupling is less than a threshold amount, to use the channel for communication with another radio device of the secondary communication system.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   transmitting, by a radio device of a secondary communication system, a signal into a channel of a primary communication system, where the signal that is transmitted is a probing signal having at least a predetermined temporally varying transmission pattern;
   monitoring, by the radio device, channel signal quality-related feedback of the primary system;
   determining, by the radio device, based on the monitored channel signal quality-related feedback, an amount of mutual coupling between the transmitted signal and the channel, if any, caused by the transmitted signal, where determining comprises correlating at least the predetermined temporally varying transmission pattern with changes, if any, in the monitored channel signal quality-related feedback; and
   if the amount of determined mutual coupling is less than a threshold amount, using by the radio device, the channel for communication with another radio device of the secondary communication system.

2. The method of claim 1, where the probing signal further has a predetermined temporally varying transmission power, and where determining comprises correlating at least the predetermined temporally varying transmission pattern and transmission power with changes, if any, in the monitored channel signal quality-related feedback.

3. The method of claim 1, where the signal that is transmitted is a communication signal transmitted to another radio device of the secondary communication system.

4. The method of claim 1, where the channel signal quality-related feedback that is monitored is comprised of at least one of ACK/NACK feedback, power control feedback, rate control feedback and channel quality indicator feedback.

5. The method of claim 1, where determining comprises estimating a level of interference at a receiver of the primary system due to the transmitted signal, where the estimated level of interference comprises at least one of an average of changes in an estimated signal to interference ratio at the receiver at times that the transmitted signal changes, and a correlation between the transmitted signal changes and the signal to interference ratio at the receiver.

6. The method of claim 1, where the temporally varying probing signal varies in an on/off manner in accordance with occurrences of time slots of the channel.

7. The method of claim 1, where if the amount of determined mutual coupling is greater than the threshold amount, the radio device of the secondary communication system transmits a signal into a different channel of the primary communication system, and repeats the operations of monitoring and determining in the different channel.

8. The method of claim 1, where if the amount of determined mutual coupling is greater than the threshold amount, the radio device of the secondary communication system transmits the signal, with a reduced power level, into the same channel of the primary communication system, and repeats the operations of monitoring and determining in the same channel.

9. The method of claim 8, where the operations of transmitting, monitoring and determining are repeated until the amount of determined mutual coupling is less than the threshold amount, and where using the channel for communication with another radio device of the secondary communication system uses the same channel with a power level that does not exceed a power level at which the signal was transmitted when the mutual coupling was determined to be less than the threshold amount.

10. The method of claim 1, performed by the radio device of the secondary communication system as a result of the execution of computer program instructions by at least one processor of the device, where the computer program instructions are stored in at least one memory of the radio device of the secondary communication system.

11. An apparatus, comprising:
    at least one processor and at least one memory including computer program code, the at least one memory and the computer program code configured to, with the at least one processor, cause the apparatus to:
    transmit a signal from a radio device of a secondary communication system into a channel of a primary communication system, where the signal that is transmitted is a probing signal having at least a predetermined temporally varying transmission pattern;
    monitor channel signal quality-related feedback of the primary system;
    determine, based on the monitored channel signal quality-related feedback, an amount of mutual coupling between the transmitted signal and the channel, if any, caused by the transmitted signal, where determining comprises correlating at least the predetermined temporally varying transmission pattern with changes, if any, in the monitored channel signal quality-related feedback; and
    if the amount of determined mutual coupling is less than a threshold amount, use the channel for communication with another radio device of the secondary communication system.

12. The apparatus of claim 11, where the probing signal further has a predetermined temporally varying transmission power, and where the at least one memory and the computer program code are further configured to, with the at least one processor, cause the apparatus correlate the predetermined temporally varying transmission pattern and transmission power with changes, if any, in the monitored channel signal quality-related feedback.

13. The apparatus of claim 11, where the signal that is transmitted is a communication signal transmitted to another radio device of the secondary communication system.

14. The apparatus of claim 11, where the channel signal quality-related feedback that is monitored is comprised of at least one of ACK/NACK feedback, power control feedback, rate control feedback and channel quality indicator feedback.

15. The apparatus of claim 11, where the at least one memory and the computer program code are further configured to, with the at least one processor, cause the apparatus to estimate a level of interference at a receiver of the primary system due to the transmitted signal, where the estimated level of interference comprises at least one of an average of changes in an estimated signal to interference ratio at the receiver at times that the transmitted signal changes, and a correlation between the transmitted signal changes and the signal to interference ratio at the receiver.

16. The apparatus of claim 11, where the at least one memory and the computer program code are further configured to, with the at least one processor, cause the apparatus to respond to a condition where the amount of determined mutual coupling is greater than the threshold amount, to transmit a signal into a different channel of the primary communication system, and to repeats the operations of monitoring and determining in the different channel.

17. The apparatus of claim 11, where the at least one memory and the computer program code are further configured to, with the at least one processor, cause the apparatus to respond to a condition where the amount of determined mutual coupling is greater than the threshold amount, to transmit the signal, with a reduced power level, into the same channel of the primary communication system, and to repeat the operations of monitoring and determining in the same channel.

18. The apparatus of claim 17, where the at least one memory and the computer program code are further configured to, with the at least one processor, cause the apparatus to repeat the operations of transmitting, monitoring and determining until the amount of determined mutual coupling is less than the threshold amount, and to use the channel for communication with another radio device of the secondary communication system with a power level that does not exceed a power level at which the signal was transmitted when the mutual coupling was determined to be less than the threshold amount.

* * * * *